United States Patent [19]

Driessen et al.

[11] Patent Number: 5,013,003
[45] Date of Patent: May 7, 1991

[54] STAND FOR ELECTRIC IRON

[75] Inventors: Pieter J. Driessen; Jan Klok, both of Groningen, Netherlands

[73] Assignee: U.S. Philips Corp., New York, N.Y.

[21] Appl. No.: 421,861

[22] Filed: Oct. 16, 1989

[30] Foreign Application Priority Data

Oct. 17, 1988 [NL] Netherlands .......... 88 02545

[51] Int. Cl.⁵ .................................. D06F 79/00
[52] U.S. Cl. ........................ 248/117.6; 248/126; 248/231.7; 403/4
[58] Field of Search .......... 248/117.6, 117.4, 117.7, 248/117.1, 117.2, 117.3, 117.5, 126, 207, 231.7, 558; 403/3, 4, 84

[56] References Cited

U.S. PATENT DOCUMENTS

| 1,656,320 | 1/1928 | Crowder | 248/117.6 |
| 1,737,081 | 11/1929 | Foucher | 248/117.4 |
| 1,903,601 | 4/1933 | Smolko | 248/117.4 |
| 2,523,685 | 9/1950 | Eichelberyer | 248/117.2 X |
| 2,904,296 | 9/1959 | Graham | 248/117.7 |
| 3,082,986 | 3/1963 | Campanizzi | 248/117.7 |
| 3,202,389 | 8/1965 | Zoffer | 248/117.4 |
| 3,295,568 | 1/1967 | Cassey | 403/84 X |
| 3,367,611 | 2/1968 | Munson | 248/117.1 |
| 3,926,392 | 12/1975 | Davidson | 248/117.1 |
| 4,159,816 | 7/1979 | Miyamae | 248/231.7 X |

Primary Examiner—David L. Talbott
Attorney, Agent, or Firm—Ernestine C. Bartlett

[57] ABSTRACT

A stand 1 for supporting an electric iron when not in use, comprising a clamping device 3 for clamping the stand onto an ironing board 4. So as to facilitate placing the iron on or taking it from the stand, the stand is provided with a rotary table 5, it being possible to attach the clamping device 3 to the rotary table. The stand also includes a storage space 17 for storing the clamping device.

10 Claims, 2 Drawing Sheets

STAND FOR ELECTRIC IRON

FIELD OF THE INVENTION

The invention relates to a stand for supporting an electric iron when not in use, comprising a clamping device for clamping the stand onto an ironing board.

BACKGROUND OF THE INVENTION

Such a stand with clamping device for an electric iron is disclosed in U.S. Pat. No. 2,714,650.

The position in which an iron is to be taken from and placed upon, respectively, the stand by the user is very important for the user. In said U.S. Pat. No. 2,714,650 the clamping device is rigidly connected to the base, that is to say it is not capable of rotation relative thereto. Consequently, the position the electric iron assumes is determined by the position in which the stand is attached to the ironing board. In certain circumstances a suitable position in which the stand is attached to the ironing board may indeed not be identical to an advantageous position of the iron for taking it up and putting it down.

SUMMARY OF THE INVENTION

The invention has for its object the provision of a solution for that situation.

According to the invention, a stand is provided having a rotatary table and means are present for attaching the clamping device to the rotary table.

As a result thereof, in any position in which the rotary table is attached, that is to say any position in which the clamping device is attached to the ironing board, the stand and consequently the electric iron present thereon can be rotated to any desired position.

In practice it has been found that it is not necessary to provide that the stand can be rotated to any position.

Therefore, in a preferred embodiment of the stand in accordance with the invention locking means are present to secure the stand in a plurality of positions relative to the rotary table.

Preferably, the locking means are constituted by a plurality of recesses provided in the bottom side of the stand opposite the rotary table, the clamping device is U-shaped, a leg of the clamping device being located, in a locked position, in one of the recesses.

It is alternatively possible for the locking means to be in the form of a spring-loaded boss indentation construction between the stand and the rotary table.

In a further embodiment of the invention, the stand is provided with a storage space for the clamping device. The stand with the electric iron can then easily be stored in a cupboard or be put elsewhere without it being necessary to store the clamping device separately or without having the clamping device obstruct storage.

In a still further embodiment is of the invention the means for attaching the clamping device to the rotary table are constituted by a hinge constructed, in which a hinge pin is arranged perpendicularly to the pivotal axis of the rotary table. The clamping device is then permanently connected to the rotary table and consequently cannot get lost. In addition, handling, that is to say attaching and removing the stand to and from the ironing board is similar. In this embodiment the storage space for the clamping device is advantageously constituted by a slotted recess in the stand. Since the clamping device is pivotal, it can be turned into the recess in a simple manner, so that the bottom side of the stand is entirely flat.

In yet another embodiment of the stand, the clamping device is of a known U-shape, in which one leg is attached to the rotary table and the other leg is provided with a screw, and said leg is pivotally connected by means of the screw to the base of the U. As a result thereof, it is possible to turn the clamping device in the slotted recess in any position of the screw i.e., no matter how far the screw has been turned into the leg of the clamping device. Consequently the dimensions of the slotted recess may be small.

BRIEF DESCRIPTION OF THE DRAWINGS

The invention and its advantages will now be described in greater detail with reference to an embodiment shown in the accompanying drawings. Herein.

DETAILED DESCRIPTION OF PREFERRED EMBODIMENTS

Figure 1:
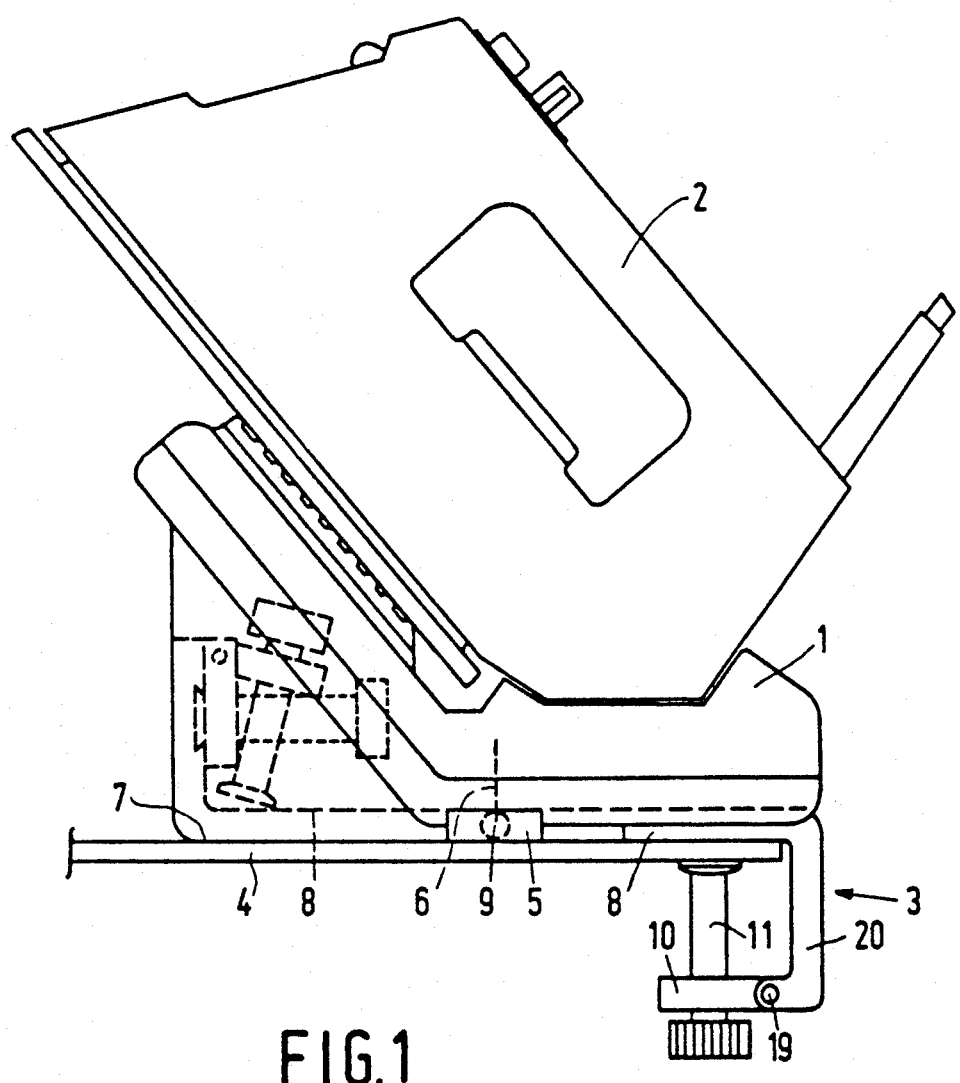
FIG. 1 is an elevational view of a stand in accordance with the inveention and an electric iron placed thereon.
Figure 2:
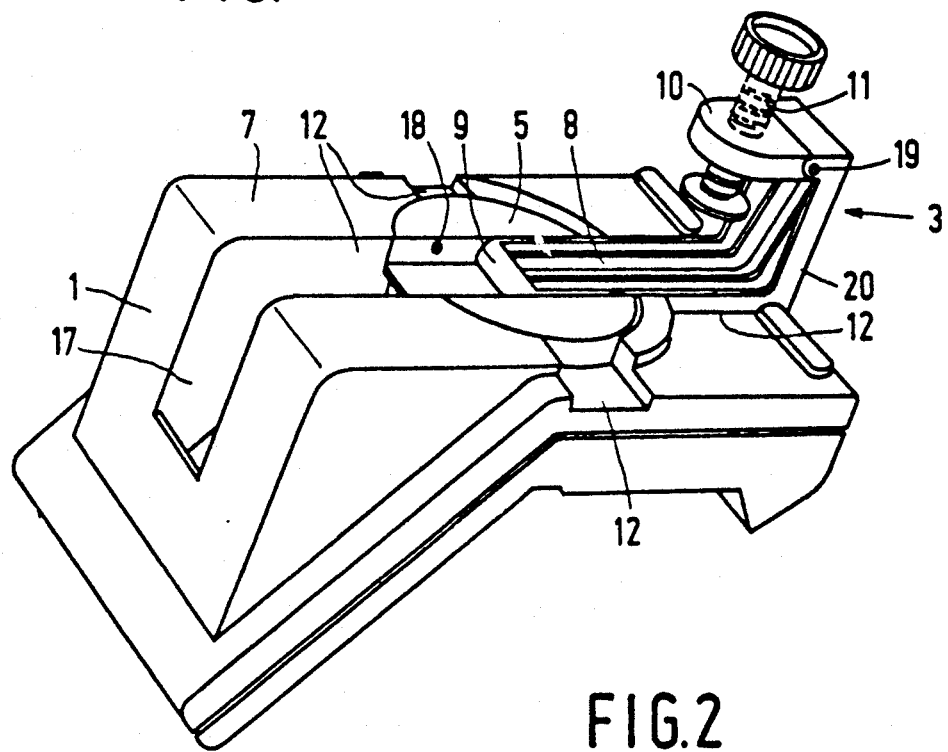
FIG. 2 is a perspective bottom view of the stand of FIG. 1.

The stand 1, shown in the Figures, for supporting an electric iron 2 while not in use, has a clamping device 3 for clamping the stand onto an ironing board 4. This provides a more stable position of the stand. According to the invention, the stand is provided with a rotary table 5, and the clamping device 3 can be attached to the rotary table. The rotary table is rotatably supported in the bottom side of the stand. The axis of rotation 6 then extends perpendicularly to the bottom face (setting face) 7 of the base. The clamping device 3 is U-shaped, which is known per se, one of the legs 8 being connected to the rotary table by means of a pivotal construction. The pivotal shaft 9 of the pivotal construction is perpendicular to the axis of rotation 6 of the rotary table. The other leg 10 of the U-shaped clamping device is provided with a screw 11.

The bottom side of the stand is provided with four recesses 12, which are located opposite the rotary table 5, forming a sort of cross. The width of each recess 12 is such that the leg 8 of the clamping device just fits therein. Thus, four positions are obtained, in which the clamping device can be locked relative to the stand. Because of the pivotal connection between the clamping device and the rotary table, the clamping device can be swiveled from a recess, thereafter positioned by means of the rotary table opposite a different recess, whereafter the clamping device can be locked again relative to the stand by moving the leg 8 into this recess.

Figure 3:
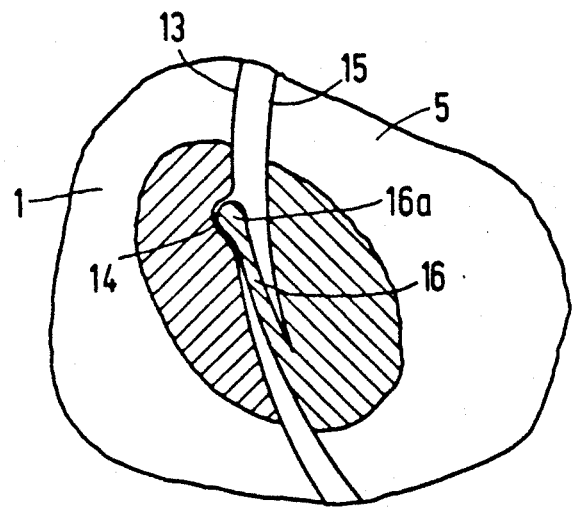
FIG. 3 is a detailed drawing of the bottom of the stand in which a locking construction is provided between the rotary table and the stand.

An alternative construction for locking the clamping device relative to the stand is a spring-loaded boss-indentation mechanism of the type shown in FIG. 3. An interior wall 13 of the aperture in the stand in which the rotary table is accommodated is provided with a plurality of indentations 14 whereas the exterior wall 15 of the rotary table is provided with a resilient lug 16. A sort of boss 16a is provided at the end of the resilient lug, to cooperate with one of the indentations 14. Preferably the rotary table is fitted with a plurality of resilient lugs with bosses, so that a sort of snap structure for different positions between the rotary table/clamping device and the stand is obtained.

Figure 4:
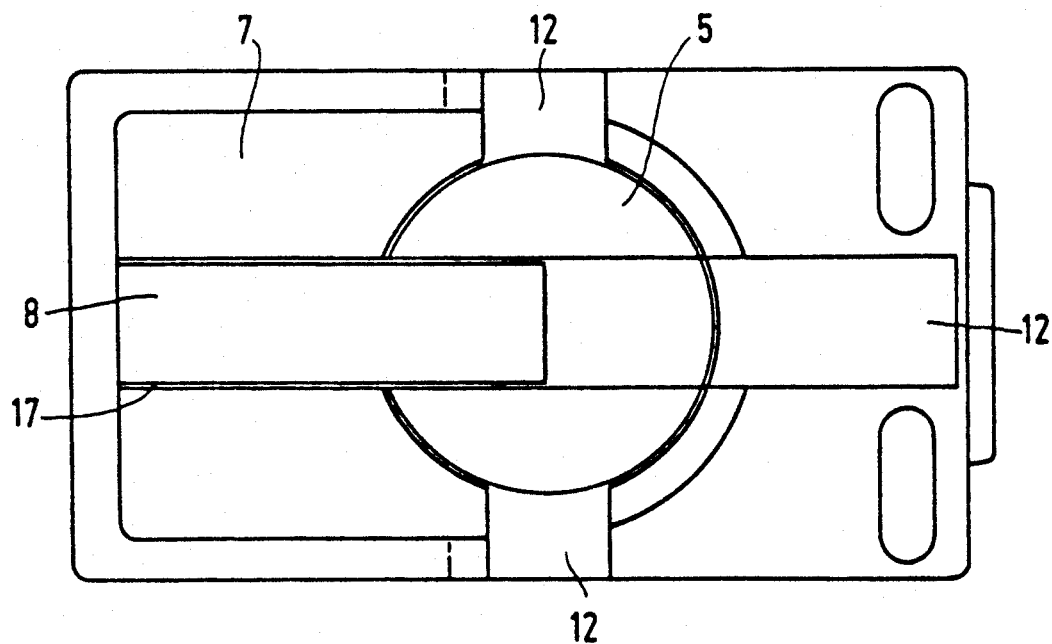
FIG. 4 is a bottom view of the stand of FIG. 1, in which the clamping device is swiveled into the storage space.

The stand further has a storage space for the clamping device 3, so that when the stand is not in use, the clamping device does not form an obstacle when the stand is stored in, for example, a cupboard. One of the recesses 12 in which the clamping device 3 is locked relative to the stand coincides with the slotted recess for storing the clamping device. To retain the clamping device in the storage position a spring-loaded boss-indentation mechanism 18 is arranged between the leg 8 of the clamping device and the rotary table. The storage position of the stand is shown in FIG. 4. So as to keep the storage space as small as possible, the leg 10 of the U-shaped clamping device 3, that is provided with the screw 11, is connected to the base 20 of the U by means of a hinge 19. Depending on how far the screw 11 is threaded into the leg 10, the leg including the screw must either be rotated or not rotated relative to the base 19. Different storage positions are shown in FIG. 1 by means of broken lines.

We claim:

1. A stand for supporting an electric iron when not in use comprising a U-shaped clamping device for clamping the stand onto an ironing board; a rotary table rotatably supported in a bottom side of said stand for rotation of the stand to the desired position; means for attaching the clamping device to the rotary table; and locking means effective to lock the stand in any one of a plurality of positions relative to the rotary table, said locking means being constituted by a plurality of recesses present in the bottom side of the stand opposite the rotary table, one leg of the clamping device being located in one of the recesses in a locked position.

2. A stand as claimed in claim 1, wherein the stand includes a storage space for the clamping device.

3. A stand as claimed in claim 2 wherein the storage space for the clamping device is constituted by a slotted recess in the stand.

4. A stand as claimed in claim 3 wherein the clamping device is U-shaped, one leg being connected to the rotary table, the other leg being provided with a screw and the latter leg being pivotally connected to the base of the U.

5. A stand as claimed in claim 2 wherein the means for connecting the clamping device to the rotary table are constituted by a hinge construction, the pivotal axis being perpendicular to a rotary axis of the rotary table.

6. A stand as claimed in claim 2 wherein the clamping device is U-shaped, one leg being connected to the rotary table, the other leg being provided with a screw and the latter leg being pivotally connected to the base of the U.

7. A stand as claimed in claim 1, wherein the means for connecting the clamping device to the rotary table are constituted by a hinge construction, the pivotal axis being perpendicular to a rotary axis of the rotary table.

8. A stand as claimed in claim 7 wherein the storage space for the clamping device is constituted by a slotted recess in the stand.

9. A stand as claimed in claim 7 wherein the clamping device is U-shaped, one leg being connected to the rotary table, the other leg being provided with a screw and the latter leg being pivotally connected to the base of the U.

10. A stand as claimed in claim 1, wherein the clamping device is U-shaped, on leg being connected to the rotary table, the other leg being provided with a screw and the latter leg being pivotally connected to the base of the U.

* * * * *